(12) United States Patent
Sample

(10) Patent No.: US 12,160,461 B2
(45) Date of Patent: *Dec. 3, 2024

(54) ONLINE TECHNICAL CAPABILITY SYSTEM AND METHOD

(71) Applicant: Online Readiness, LLC, Peoria, AZ (US)

(72) Inventor: Jay C. Sample, Surprise, AZ (US)

(73) Assignee: Online Readiness, LLC, Peoria, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,103

(22) Filed: Jan. 20, 2022

(65) Prior Publication Data

US 2022/0141280 A1    May 5, 2022

Related U.S. Application Data

(63) Continuation of application No. 16/037,852, filed on Jul. 17, 2018, now Pat. No. 11,233,842.

(60) Provisional application No. 62/533,657, filed on Jul. 17, 2017.

(51) Int. Cl.
| | |
|---|---|
| *H04L 67/025* | (2022.01) |
| *G06F 11/34* | (2006.01) |
| *G06F 11/36* | (2006.01) |
| *G06Q 30/016* | (2023.01) |
| *H04L 67/125* | (2022.01) |

(52) U.S. Cl.
CPC ............ *H04L 67/025* (2013.01); *G06F 11/34* (2013.01); *G06F 11/3616* (2013.01); *G06Q 30/016* (2013.01); *H04L 67/125* (2013.01)

(58) Field of Classification Search
CPC ...... H04L 67/025; H04L 67/125; G06F 11/34; G06F 11/3616; G06Q 30/016
See application file for complete search history.

(56) References Cited

U.S. PATENT DOCUMENTS

| | | | | |
|---|---|---|---|---|
| 11,233,842 B2* | 1/2022 | Sample | .............. | G06F 11/3616 |
| 2004/0015559 A1* | 1/2004 | Goldstein | .............. | G06Q 30/02 |
| | | | | 709/217 |
| 2012/0310625 A1* | 12/2012 | Wei | ........................ | G06F 11/368 |
| | | | | 704/8 |
| 2013/0054306 A1* | 2/2013 | Bhalla | ................ | G06Q 30/0201 |
| | | | | 705/7.31 |
| 2017/0264701 A1* | 9/2017 | Wei | ...................... | H04L 67/2871 |
| 2018/0018249 A1* | 1/2018 | Zhao | ..................... | G06F 11/263 |

FOREIGN PATENT DOCUMENTS

| | | | | |
|---|---|---|---|---|
| CN | | 103927253 B | * | 4/2017 |
| WO | WO-2003023649 A1 | | * | 3/2003 |

* cited by examiner

*Primary Examiner* — Oleg Survillo
*Assistant Examiner* — Monishwar Mohan
(74) *Attorney, Agent, or Firm* — Ivan Miles Posey

(57) ABSTRACT

An apparatus and method provide customer service for users of online applications. A first set of instructions are executable on the processor that are configured to test a device connected to a network to produce one or more test results. A second set of instructions are executable on the processor that are configured to store the one or more test results in a database. A third set of instructions are executable on the processor that are configured to retrieve the test results for display on a customer service screen during customer service.

8 Claims, 4 Drawing Sheets

ONLINE TECHNICAL CAPABILITY SYSTEM AND METHOD

RELATED APPLICATION INFORMATION

This Application is a continuation of U.S. application Ser. No. 16/037,852, entitled "Online Technical Capability System and Method", filed Jul. 17, 2018, which claims the benefit of U.S. Application Ser. No. 62/533,657, entitled "Online Technical Capability Scan Service", filed Jul. 17, 2017, the full contents of which are incorporated by reference herein.

FIELD OF THE INVENTION

The invention relates to an online technical capability system and method. Specifically, a compatibility testing system and method allows for easier and more efficient customer service.

BACKGROUND

The use of internet-connected devices for obtaining services is well-established. Many internet-based service providers require specific configurations or minimum data throughput for customers to interact with their services trouble-free. As a result of customers needing to know these requirements, service providers and organizations often post lists of requirements on their websites, defining the minimum values for these specifications. These lists stipulate for example, the minimum upload and download speeds, supported operating systems and browsers, minimum screen resolution, and so on.

The trouble with merely listing minimum technical requirements on the provider's website is that a) each user must locate these requirements, b) each user must have the technical competency to understand the requirements, and c) must be capable of remediating discrepancies when they fail to meet the technical requirements. Written using computer terminology, customers may subsequently be required to learn what these requirements mean and how to locate them on their devices before being able to determine compatibility. This process is tedious, occasionally exacting, and prone to human interpretation and error.

By employing the post-to-website method of providing customers with system configuration requirements, service providers necessarily must also offer support services with agents whose first priority for every service call is to ascertain whether the customer to whom they are speaking possesses technology adequate to meet these minimum requirements. Through a series of questions, often accompanied by directions from the help agent to the customer, time spent on a technical support transaction is extended; and because this information is foundational to providing technical support, it must be gathered for each support call.

As a result, agents providing technical support spend several minutes with every customer before being able to address the reason the customer called in the first place. This support inertia is further exaggerated when the call is interrupted and the customer is unable to reach the same agent, initiating another information gathering process, further delaying resolution.

The disadvantage of this method is that it is not only time consuming, as demonstrated above, but also costly. The cumulative impact to a support organization may represent several hours each week per agent with associated labor costs. But perhaps more importantly, this experience is frustrating to the customer who is unable to use the service for which s(he) has subscribed until the reason for the service call is resolved.

While this situation is annoying to a host of subscribers, it is particularly so for learners enrolled in online education or training programs. These customers often set aside specific times to complete learning tasks. With most of these learners engaging in courses after work and after family care has been provided; the frustration of needing to resolve basic compatibility issues is most unwelcomed. Indeed, frustration with technology remains one of the leading causes learners withdraw from online courses.

Another limitation of the existing post-to-website method is the same service providers often lack knowledge of the basic composition and range of technologies their customers use to access their services. While some information is captured with a successful log in to the service, most of what can be known about the customers' technology contexts cannot be known until the customer has authenticated to the service. Administrators thereby lack important business intelligence concerning their customers to make data-driven decisions concerning any pre-enrollment, pre-service processes, as well as the impact a considered change in system design might have on potential subscribers or enrollees. In an organization offering services internationally, this limitation is particularly vexing.

SUMMARY

According to one preferred embodiment, the present invention seeks to provide subscribers with an assessment of their technology's compatibility with a considered internet-based service before a commitment to that service is made. According to an aspect of this invention, customers would initiate an assessment via a web application to obtain detailed, human readable, compatibility metrics presented both graphically and textually on screen.

Another aspect of this invention is that customers are presented with solutions to remedy any technical deficiencies assessed by the invention. By automating both the assessment process and remediation pathways, this invention reduces time spent determining computing device and data connection compatibility to minimum technical requirements.

The invention also provides a method by which assessment results are written to a database and assigned unique record locator IDs, permitting support agents to locate individual assessment results from thousands of records should the customer make a subsequent call to the help desk. By entering the locator ID, agents are able to view the same assessment results as the customer, greatly reducing the time spent on call. And should a call be interrupted, the customer will simply share the same ID with a different agent, who locates the same record and takes up from where the call was interrupted. This improved method saves both parties time, reduces organization staffing costs, and lessens customer frustration.

The method employed by this invention also gives the service provider a global perspective of all assessments initiated by both existing and potential customers. These rich data are able to be filtered by an administrator and sorted on any parameter assessed by the invention. Some of the assessed parameters include the system clock, IP address, date and time zone, operating system, browser, presence of third-party browser components, data download and upload speeds, preferred language, and internet service provider.

The advantages of this invention affect the customer, support provider, and system administrator as follows: By removing human interpretation and potential error in assessing technical compatibility; providing a repeatable, streamlined process of facilitating technical support, and giving system leaders insight on the composition and range of technologies their customers employ to access services, this invention improves dramatically the use of internet-based services.

DETAILED DESCRIPTION OF THE PREFERRED EMBODIMENTS

For the purpose of illustrating the invention, there is shown in the accompanying drawings several embodiments of the invention. However, it should be understood by those of ordinary skill in the art that the invention is not limited to the precise arrangements and instrumentalities shown therein and described below.

Figure 1:
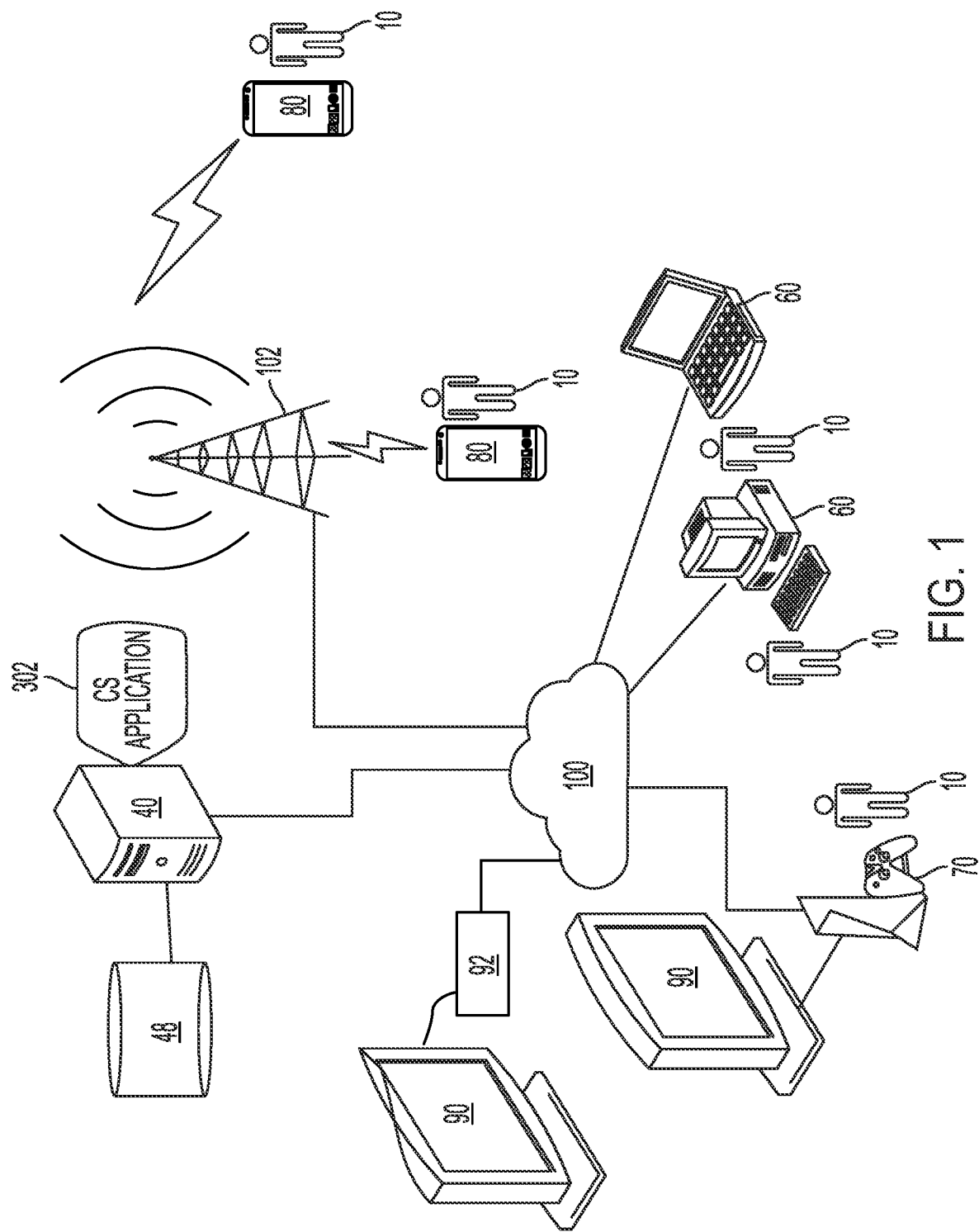
FIG. 1 is diagrammatic view of general components a network used by the invention according to one embodiment.

With reference to FIG. 1, a user 10 may wish to use an online application offered by a vendor, such as, for example, an online educational software system. In this respect, there has been a proliferation of electronic desktop and mobile platforms, such as, by way of example, and not by way of limitation, mobile phones, smartphones, feature phones, mobile tablets, iPhones®, iPads®, iPods®, Blackberrys®, personal data assistants (PDAs), tablet devices (tabs), and the like. As is typical on today's internet 100, users 10 may connect to and use the internet 100 over several platforms. Those platforms may include personal computers 60, mobile devices 80 such as mobile phones, tablets, or the like. Through any such platforms including but not limited to personal computers 60, mobile devices 80, tablets, or the like, users may access a server app or software run by the server 40. One of the latest ways to connect to the internet includes using internet protocol television, or IPTV, boxes 92. These IPTV boxes 92 include a wireless or wired device that has a memory and storage for applications or apps that connects to the internet 100. Through an IPTV box 92, users may access the software server 40. The television is typically connected to the IPTV box 92 via an HDMI cord, component cable, or audio/video (A/V) input lines.

Further, modern game consoles 70 are now capable of internet browsing and input. Game consoles 70 such as the XBOX®, Playstation®, Nintendo®, Wii®, and others, provide for internet browsing. Just as with the platforms described above, game consoles 70 typically connect to a TV 90 for browsing. With any one of these devices, or just a simple mobile device 80, users may access the server software.

One or more servers 40 may include one or more storage devices containing one or more databases 48.

Figure 2:
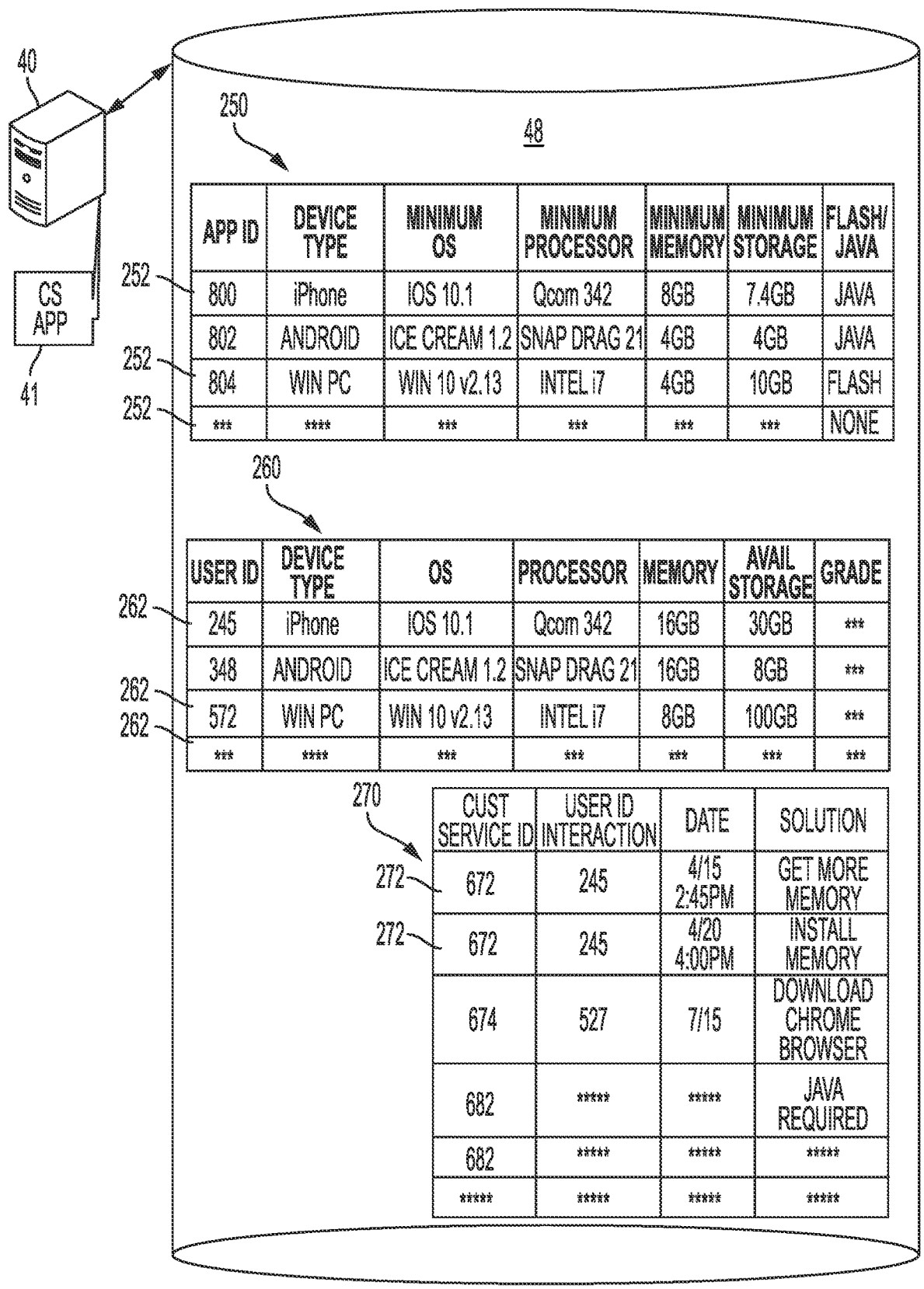
FIG. 2 a database entity diagram showing one embodiment of how received data packets may be stored, transformed, and updated in a database according the embodiment of FIG. 1 is illustrated.

With reference to FIG. 2, a database entity diagram showing one embodiment of how received data packets may be stored, transformed, and updated in the database 48 according the embodiment of FIG. 1 is illustrated. In one embodiment, the database 48 may contain a requirements table 250. Each record 252 of the requirements table 250 may contain measurements or parameters regarding the minimum user system requirements for each particular online application. For example, for each device type, the minimum processor, minimum operating system (OS) version, minimum memory, minimum available storage, whether Flash or Java is required, and other minimum requirements, may be stored. In one embodiment, the minimum parameters to be stored in the requirements table 250 are selectable by the online application owner. For each application, the application owner may provide, on a selection screen, the different minimum parameters for each device on which the application may run.

In a user device table 260, records 262 may store the measured information for each user device that is tested to access each application. Each user device may correspond to a record 262 in the device table. Each record 262 may store the device's type, operating system (OS) version of the device, processor type, memory quantity, available storage, whether Java or Flash is installed, and other parameters.

Two or more tables may be used for customer service. A customer service tracking table 270 may be used track and record the advice given to each user listing in the user device table 260. Each record 272 of the customer service tracking table 270 may contain the customer service person's identifier (ID), the user ID for the user/device to which the record pertains, the date and time of the interaction with the user, and the solution to any issues for the device in order to resolve the device for use with a particular application.

Figure 3:
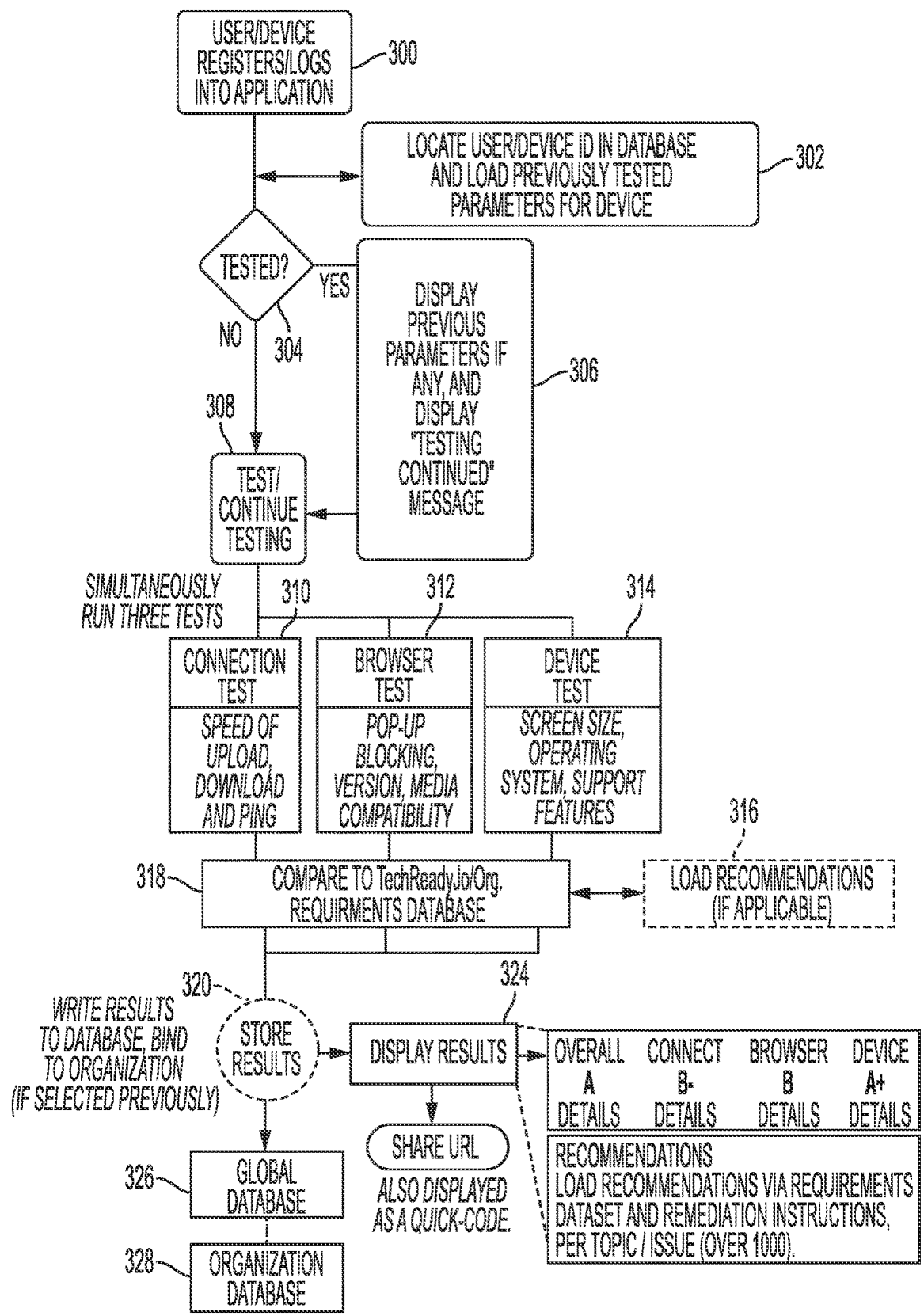
FIG. 3 is a flow diagram that illustrates the steps that may be performed by the system according to the embodiments of FIGS. 1-2.

With reference to FIG. 3, a flow diagram illustrates the steps that may be performed by the system according to the embodiments of FIGS. 1-2. In step 300, a user my register or login from a previous registration for an online application. In step 302, the table 260 is searched by the customer service application (41 in FIG. 2) to determine if the user device has been tested already. If so, step 304, then a message stating that testing is continued is displayed to the user, step 306. HTML code and/or Java code is then downloaded to the user device to begin the test 308. The downloaded code may then run a connection test, step 310, a browser test, step 312, and a device test 314, is run to populate the record 262 for the device in table 260.

In step 316, the required parameters are loaded from database 250, and compared with the results of the tests, step 318. The results of the comparison are stored in database 270 for the user/device, step 320. In one embodiment, in addition to the individual measurements stored in record 272, an overall grade may be stored. In step 324, the results may be displayed to the user.

In step 326, the results may be made global available to other application developers at the choice of the application developers and users. Further, individual application developer databases may share the data from database 48, step 328.

Figure 4:
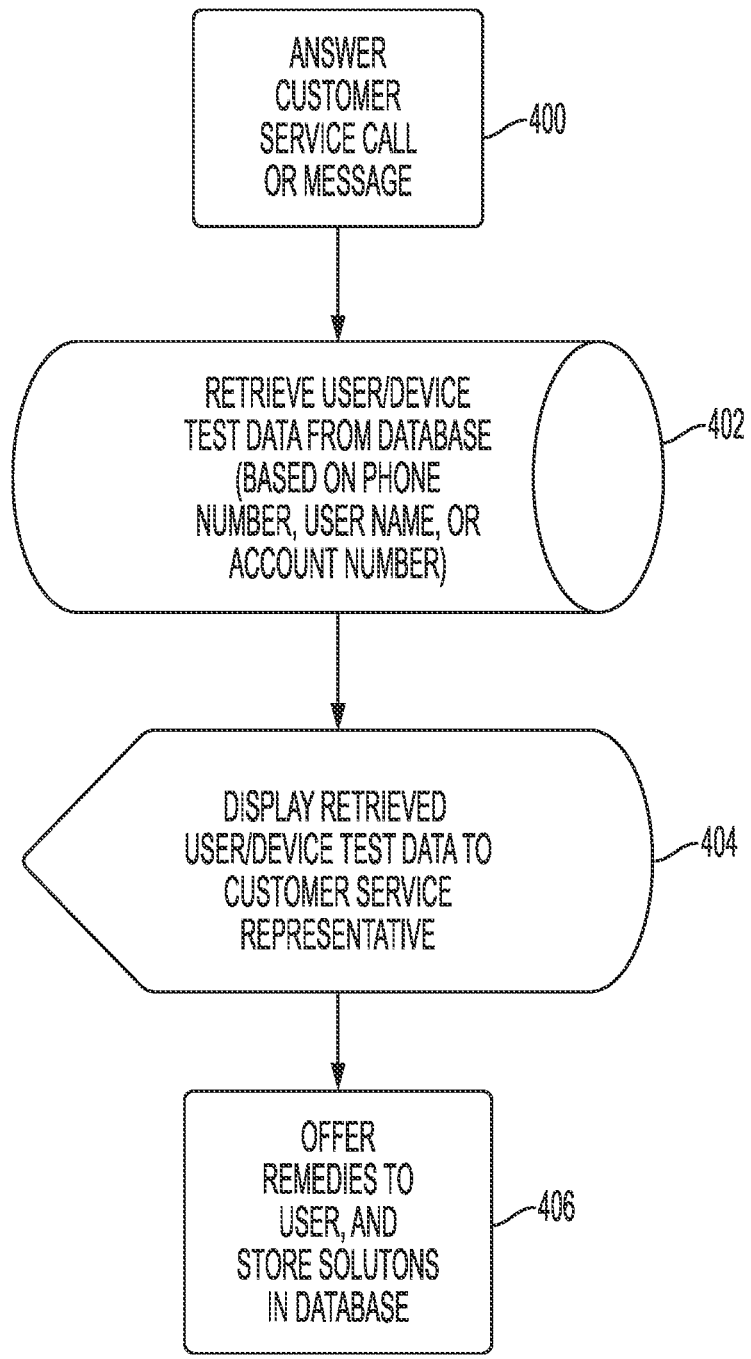
FIG. 4 is a flow diagram regarding steps taken by the system to handle customer service calls according to the embodiment of FIGS. 1-3.

With reference to FIG. 4, a flow diagram regarding steps taken by the system to handle customer service calls is shown. In step 400, the customer service agent answers a call or a message from a customer (user 10) with a device that has been tested. In step 402, either by recognition of the user's phone number, name, message data, or device ID from the device, all of the test data is retrieved from database 260. In step 404, the test data is displayed to the customer service agent. In step 406, the customer service agent may propose remedies or solutions to the test results, communicate them to the user, and store the remedies in database 270 for future retrieval and reference. For example, in this way, the customer service call, or response, takes much less time, because all of the system test information, and proposed solutions, are recorded and displayed to the customer service rep, so that there is not a new investigation every time the same customer contacts customer service.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A method for providing customer service for users of online applications, comprising:
    testing a device connected to a network to produce one or more test results;
    storing the one or more test results in a database, including an overall grade; and
    retrieving the test results for display on a customer service screen during customer service, including the overall grade;
    wherein the database contains a plurality of records, wherein each record of the database contains a customer service person's identifier (ID), a user ID for each device to which the record pertains, an indication of whether the device has been tested, a date and time of the interaction with a user related to the record, and a solution to any issues for the device in order to resolve the device for use with a particular application for reference on the customer service screen during the customer service;
    searching for the record for the device in the database and determining if the device has been tested already by reading from the record the indication of whether the device has already been tested and if the device has not been tested, to begin the test of the device and to populate the record for the device;
    wherein user ID is further capable of including a user phone number related to the user ID.

2. The method of claim 1, further comparing the test results to a set of parameters for running an online application.

3. The method of claim 2, further comprising storing the parameters in the database.

4. The method of claim 3, further comprising basing the parameters on input received from a provider of the online application.

5. An apparatus for providing customer service for users of online applications, comprising:
    a processor;
    a first set of instructions that are executable on the processor configured to test a device connected to a network to produce one or more test results, including an overall grade;
    a second set of instructions that are executable on the processor configured to store the one or more test results in a database;
    a third set of instructions that are executable on the processor configured to retrieve the test results for display on a customer service screen during customer service, including the overall grade;
    wherein the database contains a plurality of records, wherein each record of the database contains a customer service person's identifier (ID), a user ID for each device to which the record pertains, an indication of whether the device has been tested, a date and time of the interaction with a user related to the record, and a solution to any issues for the device in order to resolve the device for use with a particular application for reference on the customer service screen during the customer service;
    a fourth set of instructions that are executable on the processor configured to search for the record for the device in the database, and to determine if the device has been tested already by reading from the record the indication of whether the device has already been tested and if the device has not been tested, to begin the test of the device and to populate the record for the device;
    wherein user ID is further capable of including a user phone number related to the user ID.

6. The apparatus of claim 5, wherein the first set of instructions are further configured compare the test results to a set of parameters for running an online application.

7. The apparatus of claim 6, wherein the set of parameters are stored in the database.

8. The apparatus of claim 7, wherein the set of parameters are based on input received from a provider of the online application.

* * * * *